Patented Nov. 7, 1939

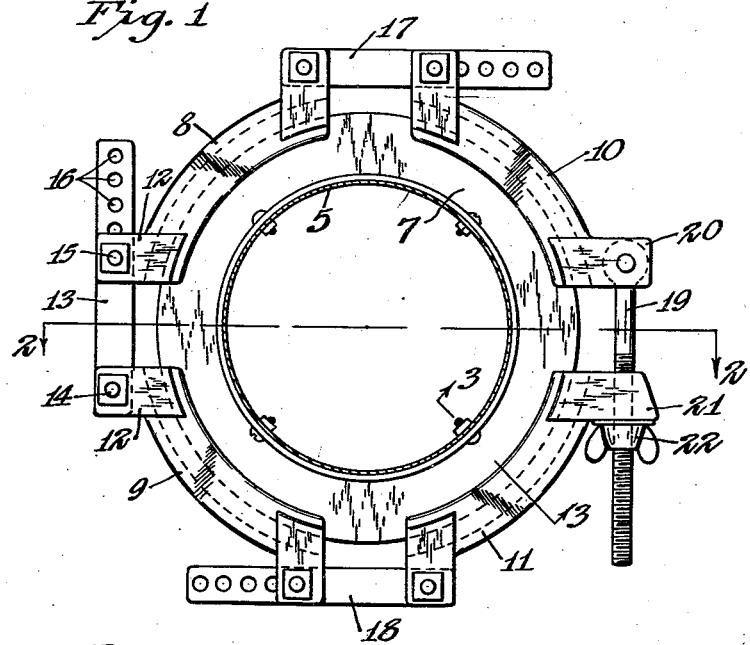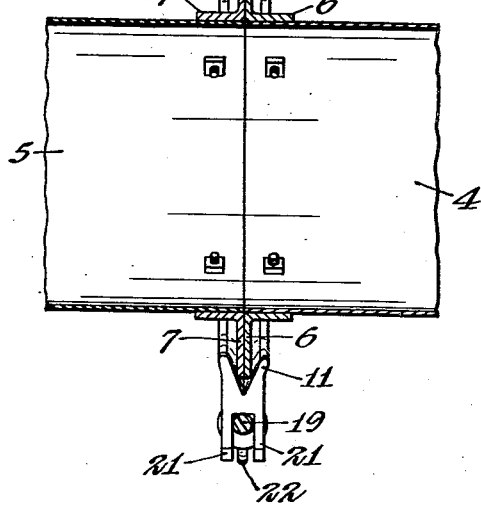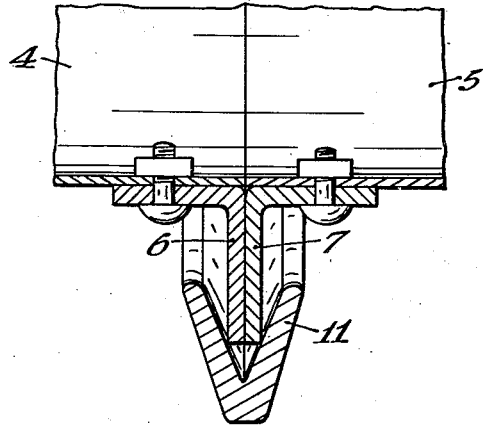

2,178,819

UNITED STATES PATENT OFFICE 2,178,819

FLANGE CLAMP FOR CONDUITS

Philip Timm, Utica, Minn.

Application March 20, 1939, Serial No. 262,953

2 Claims. (Cl. 285—129)

In the harvesting of farm crops it is common practice to transport grain, fodder and the like by means of a forced draft of air through conduits which must be taken apart and moved about frequently. The work of taking the sections apart and fastening them together again has heretofore involved much labor and consumed much time due to the nature of the means for fastening sections together that have been available. As the conduits commonly used for this purpose have end flanges which vary in diameter from about eight to twelve inches, the devices used for fastening the flanges together should be adapted for use with flanges of various diameters.

It is an object of this invention to provide a clamp for quickly and easily securing the flanges of such conduits together to the end that tight, secure joints between sections of the conduits may be formed with a minimum of work.

A further object is to provide novel clamping means of this class adapted for use with flanged conduit sections of widely different diameters.

Other objects will appear and be more fully pointed out in the following specification and claims.

Referring to the drawing:

Figure 1 is a side elevation of my improved clamp mounted on a flanged conduit of common form;

Fig. 2 is a section taken on the line 2—2 of Fig. 1, and,

Fig. 3 is a section taken on the line 3—3 of Fig. 1 and on a larger scale.

In the drawing I have shown my clamp in place on a conduit having sections 4 and 5 to be joined together. These sections have flanges 6 and 7 respectively secured thereto and projecting perpendicularly to the axis of the conduit. The flanges are shown bolted to the ends of the conduit sections but obviously may be welded or otherwise secured thereto.

My improved clamp has four arcuate members indicated respectively by the numerals 8, 9, 10 and 11 of V-shape in cross section, as best shown in Fig. 3, to embrace the flanges 6 and 7 and press these flanges together face to face by wedge action. A series of rigid, outwardly projecting pairs of ears 12 are secured to the ends of the members 8, 9, 10 and 11. The adjoining ends of the members 8 and 9 are pivotally connected together by a bar 13 and bolts 14 and 15. These bolts extend through perforations in the bar and in the pairs of ears 12 respectively. A multiplicity of perforations 16 are formed in the bar 13 so that the bolt 15 may be placed in any one of these perforations to adjust the effective length of the bar.

The adjoining ends of the members 8 and 10 are connected together by an adjustable bar 17 similar to the bar 13 and at the opposite periphery of the conduit a similar bar 18 connects the adjoining ends of the clamp members 9 and 11. A toggle bolt 19 is pivotally fastened to a pair of ears 20 projecting from an end of the clamp member 10. This bolt extends between a pair of ears 21 integral with and projecting from the clamp member 11 opposite the ears 20. A wing nut 22 is threaded on the bolt 19 to engage the ears 21.

Assuming that the clamp is in place on the adjoining flanges of conduit sections, as illustrated in the drawing, these sections may be quickly disconnected from each other by merely loosening the wing nut 22 and moving the toggle bolt 19 outward from between the ears 21. This frees the several clamp members 8, 9, 10 and 11 so that they may be pivoted radially outward, free of the conduit flanges 6 and 7. By merely reversing this operation the clamp may be applied to a pair of conduit flanges and tightened thereon to form a tight joint.

My device may be adjusted to fit flanges of widely different diameters by merely changing the bolts from one set of perforations to another in the bars 13, 17 and 18. It affords a secure fastening even in cases where the radius of curvature of the outer periphery of the flanges differs substantially from that of the clamp members 8, 9, 10 and 11 and where the thickness of the flanges is not uniform because in each case the V-shaped, flange-engaging surfaces of each of the members 8, 9, 10 and 11 grip the flanges at at least two oppositely disposed points.

It has been found that my device greatly facilitates the making of tight connections between the ends of portable conduit sections. While it is possible to obtain some of the advantages of my device with a clamp composed of three articulated sections, any fewer number of sections would not adequately press the flanges together and for best results I have found that four sections, as illustrated, are required.

Having described my invention, what I claim as new and desire to protect by Letters Patent is:

1. In a clamp for securing flanged conduit sections together, the combination of at least three arcuate clamp members, each having an arcuate groove of V-shape in cross section to receive the flanges to be joined together, links pivotally connecting said clamp members together end to end, means for adjusting the effective length of each of said links to space the ends of said members variously to embrace the outer peripheries of flanges of various diameters and means for forcibly clamping said members upon the peripheries of the flanges.

2. In a clamp for securing flanged conduit sections together, the combination of four similar, arcuate clamp members each having an arcuate groove of V-shape in cross section to receive the flanges to be joined together, three links for pivotally connecting said clamp members together end to end, each of said links having a multiplicity of perforations for bolts, pairs of bolts for severally connecting said links to the ends of said members, said bolts engaging said links in said perforations and being adjustable therein to change the spacing of the ends of said members, a toggle bolt for connecting two of said clamp members end to end and for forcibly clamping said members upon the peripheries of said flanges.

PHILIP TIMM.